United States Patent
Wadhwa

(10) Patent No.: US 10,638,785 B2
(45) Date of Patent: *May 5, 2020

(54) LIQUID DIETARY SUPPLEMENT FORMULATION COMPOSITIONS

(71) Applicant: Watermins, LLC, Newbury Park, CA (US)

(72) Inventor: Manpreet S. Wadhwa, Thousand Oaks, CA (US)

(73) Assignee: Watermins, LLC, Newbury Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/376,840

(22) Filed: Apr. 5, 2019

(65) Prior Publication Data

US 2019/0223487 A1 Jul. 25, 2019

Related U.S. Application Data

(63) Continuation of application No. 13/712,328, filed on Dec. 12, 2012, now Pat. No. 10,251,412.

(60) Provisional application No. 61/569,790, filed on Dec. 13, 2011.

(51) Int. Cl.
A23L 33/16 (2016.01)
A23L 2/52 (2006.01)
C02F 1/68 (2006.01)

(52) U.S. Cl.
CPC .............. *A23L 33/16* (2016.08); *A23L 2/52* (2013.01); *C02F 1/68* (2013.01)

(58) Field of Classification Search
None
See application file for complete search history.

(56) References Cited

U.S. PATENT DOCUMENTS

| | | | | |
|---|---|---|---|---|
| 3,993,751 | A * | 11/1976 | Zinke | 424/601 |
| 5,188,670 | A | 2/1993 | Constantz | |
| 5,364,642 | A * | 11/1994 | Altura et al. | 426/74 |
| 6,261,610 | B1 * | 7/2001 | Sher et al. | 426/74 |
| 6,485,773 | B1 | 11/2002 | Myers et al. | |
| 7,141,264 | B2 * | 11/2006 | Zhang | 426/597 |
| 8,518,383 | B2 * | 8/2013 | Haas | 424/57 |
| 2001/0010827 | A1 | 8/2001 | Altura et al. | |
| 2002/0114868 | A1 | 8/2002 | Lederman | |
| 2005/0233007 | A1 * | 10/2005 | Gugger et al. | 424/682 |
| 2005/0281918 | A1 | 12/2005 | Shibata et al. | |
| 2009/0011088 | A1 * | 1/2009 | Beeman et al. | 426/66 |
| 2009/0053366 | A1 | 2/2009 | Hurwitz et al. | |
| 2009/0142451 | A1 * | 6/2009 | Paikin et al. | 426/74 |
| 2010/0203197 | A1 | 8/2010 | Jendrysik et al. | |

FOREIGN PATENT DOCUMENTS

| | | |
|---|---|---|
| CN | 1274544 A | 11/2001 |
| WO | 9721356 A1 | 6/1997 |

OTHER PUBLICATIONS

Anonymous: "Q & A: Salt's Effect on Water's Density | Department of Physics | University of Illinois at Urbana-Champaign", Oct. 11, 2014 (Oct. 11, 2014), XP055323069, Retrieved from the Internet: URL:https://web.archive.org/web/20141011160319/http://van.physics.illinois.edu/qa/listing.php?id=1524 [retrieved on Nov. 25, 2016].
Anonymous: "Lactic Acid 88% USP Heat Stable", Nov. 25, 2016 (Nov. 25, 2016), pp. 1-1, XP055323063, Retrieved from the Internet: URL:http://webcache.googleusercontent.com/search?q=cache:fxH-fUJOUKAJ:www.adm.com/layouts/pdf.aspx?techdocid=3908&src=E+&cd=3&hl=en&ct=clnk&gl=de [retrieved on Nov. 25, 2016].

* cited by examiner

*Primary Examiner* — Tamra L. Dicus
(74) *Attorney, Agent, or Firm* — Rankin, Hill & Clark LLP

(57) ABSTRACT

Liquid dietary supplement formulation compositions that provide dietary minerals and additional optional ingredients beneficial for health; methods for manufacturing such compositions; and methods for enabling convenient oral ingestion of the formulation ingredients, by adding the same to drinking water, beverages, foods, or meals. The inventive formulation compositions generally include water, water-soluble calcium compound(s), water-soluble magnesium compound(s), and additional optional ingredients, wherein the sum of the concentrations of the calcium and magnesium compounds is most preferably 2 molar or more, up to the point of saturation. The inventive formulation compositions possess inherent resistance to microbial growth. The inventive formulation compositions and variations thereof can be used as dietary supplements to increase take of beneficial minerals, to mineralize water, to fortify foods or beverages, and can also be used to prepare a variety of additional liquid formulations by varying the calcium and magnesium compounds, and/or by adding one or more compatible ingredient(s).

14 Claims, No Drawings

LIQUID DIETARY SUPPLEMENT FORMULATION COMPOSITIONS

CROSS REFERENCE TO RELATED APPLICATION

This application is a continuation of U.S. application Ser. No. 13/712,328, filed Dec. 12, 2012, now U.S. Pat. No. 10,251,412, and claims priority to U.S. Provisional App. Ser. No. 61/569,790 filed on Dec. 13, 2011.

FIELD OF THE INVENTION

The present invention relates generally to dietary supplements and more specifically it relates to liquid dietary supplement formulation compositions that generally include water-soluble dietary minerals and additional optional ingredients that are beneficial for health; methods of designing and producing such formulation compositions, and methods to enable convenient oral ingestion of the formulation ingredients, by adding the formulations to drinking water, beverages, or meals.

BACKGROUND OF THE INVENTION

Calcium is the most abundant mineral in the body and plays both a structural and functional role in maintaining human health. While most of the body's calcium is stored in the bones and teeth, calcium also serves a critical role in processes such as vascular contraction and vasodilation, muscle function, nerve transmission, and hormonal secretion. The calcium ion is also a ubiquitous cellular messenger, and stimulates a variety of enzymes and other target proteins.

There are a number of factors that put people at risk for diseases associated with inadequate calcium intake. Calcium absorption decreases in adulthood and continues to decrease as people age. In aging adults, bone breakdown exceeds formation, resulting in bone loss. In women, menopause leads to bone loss because decreases in estrogen production both increase bone resorption and decrease calcium absorption. Negative effects on calcium balance have also been observed in amenorrhic women of childbearing age. Further, a number of people who avoid dairy products due to lactose intolerance or veganism are also at risk for calcium inadequacy. Bone health measures serve as a basis for deriving measures such as Recommended Dietary Allowances for calcium, and inadequate calcium intake increases the risk for osteoporosis, a disorder characterized by porous and fragile bones which affects more than 10 million U.S. adults. In addition to its effects on bone health, calcium intake has been proposed to have beneficial effects on reducing cardiovascular disease risk, lowering blood pressure, and prevention of colorectal cancer and prostate cancer.

Magnesium is another essential mineral in the body. About half of total body magnesium is found in bone, while the other half is found within body tissues. Magnesium is required for more than 300 biochemical reactions in the body, and is important for maintaining the function of muscles and nerves, supporting the immune system, maintaining bone health, regulating blood sugar levels, maintaining normal blood pressure, and playing a role in energy metabolism and protein synthesis. Dietary studies suggest that many Americans do not get adequate amounts of magnesium. As magnesium absorption is regulated by the intestines and excretion is regulated by the kidneys, conditions affecting these organs may result in magnesium deficiency. For example, medicines that affect the kidneys such as diuretics and some antibiotics and antineoplastic medications may cause excessive loss of magnesium. Diabetes may result in magnesium loss due to increased magnesium loss in urine due to hyperglycemia. Alcoholism is associated with low blood levels of magnesium, and individuals with chronic malabsorptive problems such as those with Chrohn's disease, gluten sensitive enteropathy, regional enteritis, or intestinal surgery are also at risk for magnesium deficiency.

Given the number of people at risk for calcium and magnesium deficiency, there is an ongoing need for effective dietary supplements that can provide or improve an intake of these minerals to help meet nutritional requirements while being convenient and easy to use for the consumer. There are many dietary supplements containing calcium and magnesium compounds that are commercially available or described in prior literature. The vast majority of these are solid dosage forms, such as tablets, capsules, or powders. Although these supplements are relatively inexpensive, they have some disadvantages. Absorption of the nutrients from these supplements tends to be quite variable, and large tablets or capsules are frequently not suitable for pediatric, geriatric and some patient populations. Liquid dosage forms of calcium and magnesium possess some advantages over the solid dosage forms in terms of better absorption, convenience of use and dosing flexibility, but are less commonly available. The liquid formulations tend to have stability limitations and are vulnerable to microbial growth in the absence of additional preservatives. Almost all marketed liquid formulations of calcium and magnesium are particulate suspensions that tend to settle, and carry a requirement to "shake well before use". These products can have variable absorption, depending upon the suspension characteristics, and can lead to incorrect dosing if not shaken well prior to use. There are few liquid products where the calcium and magnesium are completely dissolved in water and present in an ionic state to provide optimal absorption upon ingestion. However, the calcium and magnesium mineral concentrations of such formulations are relatively low compared to those of the suspension liquid products, and thus require relatively large volume dosages to meet the recommended daily allowances. Thus, there is a need for improved liquid dietary supplement formulations where calcium and magnesium are present in relatively high concentrations, are completely dissolved, and are inherently stable and resistant to microbial growth.

BRIEF SUMMARY OF THE INVENTION

The invention generally relates to liquid dietary supplement compositions which include water, water-soluble calcium compound(s), water-soluble magnesium compound(s), and optional ingredients. The total sum of concentrations of the dissolved calcium and magnesium compounds is higher than the dissolved concentrations found in currently available liquid supplements, and is at least 1 Molar. These compositions possess resistance to microbial growth which allows reduction or elimination of additional preservatives in the compositions. Thus the compositions possess some useful features that are not found in the existing soluble liquid compositions of calcium and magnesium.

There have thus been outlined, rather broadly, some of the features of the invention in order that the detailed description thereof may be better understood, and in order that the present contribution to the art may be better appreciated. There are additional features of the invention that will be described hereinafter. In this respect, it is to be understood that the invention is not Limited in its application to the details of construction or to the arrangements of the components set forth in the following description. The invention is capable of other embodiments and of being practiced and carried out in various ways. Also, it is to be understood that the phraseology and terminology employed herein are for the purpose of the description and should not be regarded as limiting.

An object of the invention is to provide liquid dietary supplement formulation compositions that are beneficial for health, and a convenient method of orally ingesting these supplements by adding to drinking water or other suitable beverages.

Another object is to provide formulation compositions that are useful for adding beneficial minerals to distilled, reverse-osmosis filtered or otherwise deionized waters, in order to make these waters more beneficial for health.

Another object is to provide formulation compositions that can be used as liquid dietary supplements to increase intake of minerals that are beneficial for human health.

Another object is to provide liquid formulation compositions that inhibit or prevent microbial growth, and into which additional compatible minerals, vitamins, and/or other useful ingredients can be added to enable a variety of liquid dietary supplements.

Another object is to provide a method of designing a variety of additional formulation compositions by building upon the basic calcium and magnesium formulation compositions disclosed in this invention, and variations thereof.

Another object is to provide methods of preparing or manufacturing the above-mentioned formulations.

Another object is to provide formulation compositions that allow convenient methods of oral consumption of the formulation ingredients by diluting or mixing relatively small quantities of the formulation compositions into drinking water, juices, other beverages, or foods.

Another object is to provide methods of fortifying a beverage or food by adding relatively small quantities of the formulation compositions into drinking water, juices, other beverages, foods or meals.

Another object is to provide kits as a convenient means for fortifying a beverage or food at point of consumption, or for fortifying a beverage or food at point manufacture for subsequent distribution.

Other objects, advantages and variations of the present invention will become obvious to those familiar with the art, and it is intended that these objects, advantages and variations are within the scope of the present invention. To the accomplishment of the above and related objects, this invention may be embodied in the form described in the accompanying embodiments and examples, attention being called to the fact however, that these are illustrative only and non-limiting.

DETAILED DESCRIPTION OF THE INVENTION

A. Definitions

"Water" as used herein refers to purified water which is suitable for drinking and is reasonably free of contamination from extraneous matter or dissolved substances that could react unfavorably with the other ingredients of the formulations described.

"Water solubility" as used herein means the maximum amount of a compound or ingredient that will dissolve in pure water at a given temperature.

"Water soluble" (or "water-soluble") as used herein means an ingredient, element or material capable of dissolving in water, by going into a liquid aqueous state, either spontaneously or by employing commonly used methods to aid dissolution such as shaking, mixing, heating, cooling, and adjusting water pH with an acid or base to make the water acidic or alkaline.

The term "stable" as used herein means formulations capable of maintaining their dissolved ingredients in solution without precipitating those ingredients out for a minimum of 3 months, more preferably at least 6 months, even more preferably 9 months and most preferably 12 months or more.

The term "room temperature" as used herein is the commonly accepted range from 59° to 77° F. (15° to 25° C.) which is suitable for human occupancy and at which laboratory experiments are usually performed.

The term "beverage" as used herein means water or any other potable liquid suitable for human or animal consumption in a ready-to-serve, drinkable form.

The term "clear" as used herein means transparent, with few or no visible particulates present, and indicative of formulations with fully dissolved ingredients.

"Saturation" or "point of saturation" as used herein means the point at which water will not dissolve any more of a chemical in solution.

As used herein, an ingredient of a formulation composition of the invention is "compatible" with the composition when it can be incorporated into the composition without making the resulting composition unsuitable for its intended use.

"Compound" as used herein refers to a material, element or ingredient. For example, a calcium compound refers to a calcium containing material that is either naturally occurring or chemically synthesized, either organic or inorganic in nature, and includes materials or ingredients referred to by specialized terms such as chemicals, salts, complexes, chelates, isomers, acids, bases etc.

"Molar" or "Molarity" as used herein is a unit of concentration, and refers to the number of moles of solute divided by the number of liters of solution.

"Cup" as used herein means a volume of 8 fluid ounces or about 240 milliliters. "Cup" may also refer to a drinking vessel that holds the same volume.

"Serving" of food as used herein refers to the portion of food used as a reference on its nutrition label, or is the typical recommended portion of that food to be eaten.

"RDA" as used herein refers to recommended dietary (or daily) allowance, the amount of nutrient intake per day considered necessary for maintenance of good health as set forth in the Recommended Dietary Daily Allowance—Food and Nutrition Board, National Academy of Sciences—National Research Council.

"Juice" as used herein has a meaning ascribed to it by a person of ordinary skill in the art and includes a full strength juice a juice drink containing less than 100% juice, a concentrate of juice, or a diluted juice from fruits, vegetables or other produce, which can be squeezed and/or crushed to produce a juice.

"Fruit flavor" as used herein refers to those flavors derived from the edible reproductive part of a seed plant, especially one having a sweet pulp associated with the seed.

Also included within the term "fruit flavor" are synthetically prepared flavors made to simulate fruit flavors derived from natural sources.

"Botanical flavor" as used herein refers to flavors derived from parts of a plant other than the fruit. As such, botanical flavors can include those flavors derived from essential oils and extracts of nuts, bark, roots and leaves. Also included within the term "botanical flavor" are synthetically prepared flavors made to simulate botanical flavors derived from natural sources.

"Flavonoid" as used herein refers to a group of phenol-containing compounds found in plants that may be beneficial for health, and are also sometimes referred to as bioflavonoids, flavanols, flavonols, flavones, isoflavonoids, neoflavonoids, and polyphenols.

"Emulsion" as used herein refers to a dispersion of minute droplets of one liquid in another liquid, the two liquids being poorly miscible or immiscible with each other, and "emulsification" refers to any process of producing an emulsion.

"Suspension" as used herein refers to a dispersion of small particles of a solid in a liquid, the solid being poorly soluble or insoluble in the liquid. "Suspension" may also refer to any process of producing a suspension.

"Solubilization" or "Solubilize" as used herein refers to making insoluble or poorly soluble substance more soluble, by the addition of solubilizing agent(s) such as detergents or co-solvents.

"Fortify" as used herein refers to increasing, improving or supplementing the nutritious value of a food or beverage by adding minerals, vitamins etc.

In certain jurisdictions, (here may not be any generally accepted definition of the terra "comprising." As used herein, the term "comprising" is intended to represent "open" language which permits the inclusion of any additional elements.

Additional self-explanatory terms, and terms commonly used in the art are utilized at various places in the application.

B. Main Elements of the Formulation Compositions

The formulation compositions of this invention have four major categories of ingredients that are described in more detail below. These comprise water water-soluble calcium compound(s), water-soluble magnesium compound(s), and optional compounds or ingredients that will be described further. The calcium and magnesium compounds are dissolved within water so that the sum of their concentrations is at least 1 Molar or more; and additional compounds may also be present. All of the compounds or ingredients are preferably obtained from food grade or higher quality sources. Alternatively, the compounds are from lower quality sources, but amenable to purification to make them suitable for human or animal use. The compounds may be inorganic or organic, may exist as anhydrous or hydrated forms, as D or L isomers, as mixtures, and in liquid, solid or gas states.

1. Water

Water (of suitable purity) is chemically denoted as $H_2O$ and comprises the first main element. Water is required as a solvent vehicle for the various formulation compositions described in this invention. Various methods of producing purified water are known in the art and include filtration, deionization, reverse-osmosis, distillation, among others. Purified water may also be obtained from a natural, reasonably pure source such as from rain or snow.

2. Water-Soluble Calcium Compound(s)

Water-soluble calcium compound(s) such as calcium chloride comprises the second main element. The second main element provides calcium which is an essential mineral for human and animal health. There are many water-soluble calcium compounds suitable for oral ingestion within a dietary supplement. The water-soluble compounds may be inorganic or organic, and may exist as anhydrous or hydrated forms, or as D or L isomers. These may all be used in the formulation compositions of the invention, either as a single calcium compound, or as a combination of calcium compounds, provided that the selected ingredients are water soluble to some extent and are compatible with the other dissolved ingredients in the formulation. Various examples of calcium compounds are provided later in this application.

3. Water-Soluble Magnesium Compound(s)

Water-soluble magnesium compound(s) such as magnesium chloride comprises the third main element. The third main element provides magnesium which is an essential mineral for human and animal health. There are many water-soluble magnesium compounds suitable for oral ingestion within a dietary supplement. The water-soluble compounds may be inorganic or organic, and may exist as anhydrous or hydrated forms, or as D or L isomers. These may all be included in the formulation compositions of the invention, either as a single magnesium compound, or as a combination of magnesium compounds, provided that the selected ingredients are water soluble to some extent, and are compatible with the other dissolved ingredients in the formulation. Various examples of magnesium compounds are provided later in this application.

4. Optional Ingredients

The formulation compositions of this invention may have additional optional ingredients or compounds compatible with the above-mentioned main elements (i.e. water, water-soluble calcium compound(s) and water-soluble magnesium compound(s)). The optional ingredients may be added, for example, to enhance the nutritional profile of the composition or improve its organoleptic or physicochemical properties. These optional ingredients may include one or more additional compatible mineral(s), vitamin(s), antioxidant(s), herbal extract(s), flavonoid(s), flavoring agent(s), sweetener(s), bracer(s), buffering agent(s), coloring agent(s), pH modifier(s), preservative(s), and the like. There is no limit to the type or number of optional ingredients which may be included, provided that they are suitable for use within a dietary supplement, and are compatible with the other dissolved ingredients in the formulation. Although it is preferable that the optional ingredients are water soluble, even poorly soluble or water-insoluble ingredients may be added, by utilizing co-solvents or solubilizing agents, or by preparing suspensions or emulsions. Various examples of optional compounds are provided later in this application.

C. Some Examples of Calcium-, Magnesium-, and Optional Compounds

Some examples of calcium compounds, magnesium compounds, and optional compounds (including compatible mineral(s), vitamin(s), antioxidant(s), herbal extract(s), flavonoid(s), flavoring agent(s), sweetener(s), bracer(s), buffering agent(s), coloring agent(s), pH modifier(s), preservative(s), and the like) that may be included in the compositions of the invention are listed below. It is to be understood that the listing of compounds is not comprehensive, and represents commonly used compounds of varying water solubility that may be suitable for human or animal use. When present, the optional mineral(s), vitamin(s) etc. are typically present in amounts sufficient to provide at least about 1%, more preferably at least about 5%, still more preferably at least about 10%, even more preferably at least about 20%, and most preferably at least about 30% of the RDA in a convenient ingestable volume (e.g. about 1 teaspoon to 2 tablespoons, or about 5 to 30 ml) of the formulation composition, where such RDAs are established. In cases where no RDAs are established, such as in the case of many types of optional compound(s) such as antioxidants, herbal extracts, flavonoids, flavoring agents, sweeteners, bracers, buffering agents, coloring agents, pH modifiers and preservatives, those skilled in the art will understand and utilize amounts that are generally safe and effective in providing the desired results. Much information is available in the art that allows selection of such amounts, and further, such amounts can also be selected or varied by means of systematic experimentation.

1. Calcium Compounds

Non-limiting example of calcium compounds that may be included include calcium acetate, calcium acetylsalicylate, calcium amino acid complexes, calcium ascorbate, calcium aspartate, calcium asparginate, calcium benzoate, calcium bicarbonate, calcium bisglycinate, calcium bisulfite, calcium borogluconate, calcium bromate, calcium bromide, calcium bromolactobionate, calcium carbonate, calcium caseinate, calcium chlorate, calcium chloride, calcium citrate, calcium citrate malate, calcium hydroxycitrate, calcium potassium citrate, calcium cyclamate, calcium diethylacetate, calcium ferrous citrate, calcium formate, calcium fumarate, calcium glubionate, calcium glucarate, calcium gluceptate, calcium gluconate, calcium glutamate, calcium glycerophosphate, calcium glycinate, calcium hexametaphosphate, calcium histidinate, calcium hydroxyapatite, calcium hydroxide, calcium hypophosphite, calcium iodate, calcium iodide, calcium ketoglutarate, calcium lactate, calcium lactate gluconate, calcium lactate gluconate citrate, calcium lactobionate, calcium laevulinate, calcium lysinate, calcium magnesium acetate, calcium methionate, calcium malate, calcium methylfolate, calcium nitrate, calcium nitrite, calcium orotate, calcium oxide, calcium pantothenate, calcium perchlorate, calcium permanganate, calcium picolinate, calcium pidolate, mono-, di- and tri-calcium phosphate, calcium propionate, calcium pyruvate, calcium saccharin, calcium silicate, calcium sodium lactate, calcium sorbate, calcium spirulina chelate, calcium stearate, calcium stelate, calcium succinate, calcium sulphate, calcium sulfite, calcium tartrate, calcium threonate, and calcium ureidosuccinate.

2. Magnesium Compounds

Non-limiting example of magnesium compounds that may be included include magnesium acetate, magnesium acetylsalicylate, magnesium amino acid complexes, magnesium ascorbate, magnesium asparginate, magnesium aspartate, magnesium benzoate, magnesium bicarbonate, magnesium bisglycinate, magnesium bromate, magnesium bromide, magnesium carbonate, magnesium chlorate, magnesium chloride, magnesium citrate, magnesium citrate malate, magnesium potassium citrate, magnesium formate, magnesium fumarate, magnesium gluceptate, magnesium gluconate, magnesium glutamate, magnesium glycerophosphate, magnesium glycinate, magnesium histidinate, magnesium hydroxide, magnesium hypophosphite, magnesium iodate, magnesium iodide, magnesium lactate, magnesium lactate gluconate, magnesium ketoglutarate, magnesium lysinate, magnesium malate, magnesium nitrate, magnesium nitrite, magnesium orotate, magnesium oxide, magnesium perchlorate, magnesium permanganate, magnesium peroxide, magnesium picolinate, magnesium pidolate, mono-, di- and tri-magnesium phosphate, magnesium propionate, magnesium pyruvate, magnesium saccharin, magnesium salicylate, magnesium selenate, magnesium potassium selenate, magnesium silicate, magnesium succinate, magnesium sulfate, magnesium tartrate, magnesium taurate.

3A. Other Mineral Compounds

Minerals other than calcium and magnesium are well-known in the art. Examples of additional optional mineral(s) that may be included include, but are not limited to, compounds of boron, cobalt, copper, chromium, fluorine, iodine, iron, manganese, molybdenum, nickel, phosphorus, potassium, selenium, silicon, silver, sodium, strontium, sulphur, vanadium, zinc and other trace minerals. These may all be used in the formulation compositions of the invention, either as a single compound, or as a combination of compounds, or by in-situ formation such as by a reaction between acid and base, provided that the selected ingredients are compatible with the other dissolved ingredients in the formulation.

Non-limiting example of forms of boron that may be optionally included include boric acid, boric anhydride, boron ascorbate, boron gluconate, boric tartrate, sodium borate, sodium tetrahydroborate, boron citrate, boron glycinate, boron aspartate and boron amino acid complexes.

Non-limiting example of forms of cobalt that may be optionally included include cobalt acetate, cobalt carbonate, cobalt chloride, cobalt glucoheptonate, cobalt gluconate, cobalt sulfate, cobalt amino acid complexes, cobalamin, cyanocobalamin, hydroxycobalamin and methylcobalamin.

Non-limiting forms of copper that may be optionally included include, copper bisglycinate, copper citrate, copper hydroxide carbonate, copper sebacate, copper lysinate, copper gluconate, copper sulfate, copper oxide and copper amino acid complexes.

Non-limiting examples of forms of chromium that may be optionally included include chromic acetate, chromic chloride, chromic lactate hydroxide, chromium nicotinate, chromic nitrate, chromium picolinate, chromic sulfate, and chromium amino acid complexes.

Non-limiting examples of forms of fluorine that may be optionally included include calcium fluoride, potassium fluoride, sodium fluoride, and sodium monofluorophosphate.

Non-limiting examples of forms of iodine that may be optionally included include potassium iodide, sodium iodide, potassium iodate, sodium iodate, and iodine casein.

Non-limiting examples of forms of iron (ferrous and/or ferric) that may be optionally included include iron bisglycinate, iron carbonate, iron gluconate, iron sulfate, iron fumarate, iron succinate, iron gluconate, iron lactate, iron tartrate, iron taurate, iron ammonium citrate, iron citrate, iron pidolate, iron picolinate, iron pyrophosphate, iron saccharate, and iron amino acid complexes.

Non-limiting examples of forms of manganese that may be optionally included include manganese aminoate, manganese ascorbate, manganese bisglycinate, manganese aspartate, manganese arginate, manganese picolinate, manganese carbonate, manganese chloride, manganese citrate, manganese dioxide, manganese gluconate, manganese glycinate, manganese glycerophosphate, manganese pidolate, manganese sulfate and manganese amino acid complexes.

Non-limiting examples of forms of molybdenum that may be optionally included include ammonium molybdate, molybdenum citrate, molybdenum picolinate, potassium molybdate and sodium molybdate.

Non-limiting examples of nickel compounds that may be optionally included include nickel chloride and nickel sulfate.

Non-limiting examples of forms of phosphorus that may be optionally included include sodium, potassium, calcium and magnesium salts of phosphoric acids and hydroxylapatite.

Non-limiting examples of forms of potassium that may be optionally included include potassium bicarbonate, potassium carbonate, potassium chloride, potassium gluconate, potassium glycerophosphate, potassium hydroxide, potassium phosphate, potassium citrate, potassium lactate, potassium malate, potassium pyruvate, and potassium amino acid complexes.

Non-limiting examples of forms of selenium that may be optionally included include include selenium oxide, sodium selenite, sodium selenate, potassium selenide, and organic forms such as selenomethonine and selenocysteine.

Non-limiting examples of forms of silicon that may be optionally included include orthosilicic acid, silica hydride, silicon dioxide, potassium silicate and sodium silicate.

Non-limiting examples of forms of silver that may be optionally included include colloidal silver and silver chelate complexes.

Non-limiting examples of forms of sodium that may be optionally included include sodium bicarbonate, sodium carbonate, sodium citrate, sodium chloride, sodium gluconate, sodium lactate, sodium hydroxide, sodium phosphate and sodium amino acid complexes.

Non-limiting examples of strontium that may be optionally included include strontium carbonate, strontium lactate, strontium citrate, strontium ralenate, and strontium gluconate.

Non-limiting examples of forms of sulphur that may be optionally included include cysteine, methionine, and methylsulfonylmethane.

Non-limiting examples of forms of vanadium that may be optionally included include bis-oxovanadium, sodium metavanadate, vanadium amino acid complexes, vanadium aspartate, vanadium citrate, vanadium glycinate, vanadyl nicotinate, vanadyl sulfate.

Non-limiting examples of forms of zinc that may be optionally included include zinc lactate, zinc sulfate, zinc chloride, zinc acetate, zinc gluconate, zinc glycinate, zinc ascorbate, zinc citrate, zinc arginate, zinc ascorbate, zinc aspartate, zinc bisglycinate, zinc lysinate, zinc malate, zinc picolinate, zinc pidolate, zinc orotate, zinc oxide and zinc amino acid complexes.

3B. Vitamins and Antioxidants

Non-limiting examples of vitamins, antioxidants and related compounds that may be optionally included in the formulation compositions of the invention include biotin, carnitine, coenzyme Q10, choline, folic acid, inositol, lycopene, lutein, astaxanthin, zeaxanthin, vitamin A (beta-carotene, carotenoids, retinol, retinol-acetate, retinol-palmitate), vitamin $B_1$ (thiamine), vitamin $B_{12}$ (cobalamin, cyanocobalamin, dibencozide, hydroxocobalamin, methylcobalamin), vitamin $B_2$ (riboflavin), vitamin $B_3$ (niacin, niacinamide), vitamin $B_5$ (pantothenic acid, sodium pantothenate, calcium pantothenate, pantethine), vitamin $B_6$ (pyridoxine, pyridoxal, pyridoxal-5-phosphate, pyridoxamine), vitamin C (ascorbic acid, ascorbate salts), vitamin D (cholecalciferol, ergocalciferol), vitamin E (tocopherols, tocotrienols), and vitamin K (phylloquinone, phtyomenadione, menaquinone).

3C. Herbal Extracts and Flavonoids

Herbal extracts are well known in the art and are also referred to as botanical extracts. Flavonoids are natural substances present in a variety of plant sources (e.g., fruits, vegetables, and flowers), and are suggested to be beneficial for health. They may also have antioxidant activity. Herbal extracts and flavonoid(s) which may be optionally included in the present invention can be extracted from, for example, fruit, vegetables, green tea, plant parts or mixtures thereof, by any suitable method well known to those skilled in the art. Alternatively, specific herbal compound(s) or flavonoid(s) may be prepared by synthetic or other appropriate biochemical methods and incorporated into the present compositions. Non-limiting examples of the most common flavonoids which are extracted from tea plants and other plants include, for example, apigenin, catechins, epicatechin, gallocatechin, epigallocatechin, epicatechin gallate, epigallocatechin gallate, kaempferol, luteolin, myricetin, quercetin, rutin, tannins, theaflavins.

3D. Flavoring Agents

Non-limiting examples of flavoring agents that may be included include fruit flavors, botanical flavors, and the like. Non-limiting examples of fruit flavors include orange, lemon, lime, grapefruit, apple, grape, cherry, pineapple, fruit punch, strawberry, kiwi, tangerine, raspberry, mango, cocoa, papaya, apricot, passion fruit, and cupuacu. Non-limiting examples of botanical flavors include kola, tea, aloe vera, guarana, ginseng, ginkgo, hawthorn, hibiscus, rose hips, chamomile, peppermint, fennel, ginger, licorice, lotus, schizandra, saw palmetto, sarsaparilla, safflower, St. Johns Wort, curcuma, cardamom, nutmeg, cassia bark, bunchu, cinnamon, jasmine, chrysanthemum, water chestnut, sugar cane, lychee, bamboo shoots, vanilla, and coffee.

3E. Sweeteners

The compositions of the present invention may optionally contain an appropriate amount of one or more sweetener(s), including carbohydrate sweeteners and natural and/or artificial no/low calorie sweeteners. The amount of the sweetener used in the compositions of the present invention typically depends upon the particular sweetener used and the sweetness intensity desired.

The compositions of the present invention can be sweetened with any of the carbohydrate sweeteners, preferably monosaccharides and/or disaccharides. Preferred sugar sweeteners for use in compositions of the present invention are sucrose, unrefined cane sugars, honey, agave nectar, fructose, glucose, and mixtures thereof, particularly sucrose and fructose. Fructose can be obtained or provided as liquid fructose, high fructose corn syrup, dry fructose or fructose syrup, but is preferably provided as high fructose corn syrup.

Non-caloric or low calorie sweeteners may optionally be used in the compositions of the present invention to sweeten such compositions. Non-limiting examples of such sweeteners include stevia, erythritol, glycerin, licorice, glycyrrhizins, aspartame, saccharine, cyclamates, acesulfame K, L-aspartyl-L-phenylalanine lower alkyl ester sweeteners, L-aspartyl-D-alanine amides, L-aspartyl-D-serine amides, L-aspartyl-hydroxymethyl alkane amide sweeteners, L-aspartyl-1-hydroxyethylalkane amide sweeteners, and synthetic alkoxy aromatics.

3F. Bracers

As is commonly known in the art, bracers can have a beneficial physiological effect such as increased mental alertness. Bracers can be obtained by extraction from a natural source or can be synthetically produced. Non-limiting examples of bracers that may be optionally included include methylxanthines, e.g., caffeine, theobromine, and theophylline. Additionally, one or more of these bracers are present in, for example, coffee, tea, kola nut, cacao pod, mate, yaupon, guarana, puerh, and yoco. Natural plant extracts from the above sources are the preferred sources of bracers as they may contain other compounds that are also desirable.

The most preferred methylxanthine is caffeine. Caffeine may be obtained from the aforementioned plants or, alternatively, may be synthetically prepared. Preferred botanical sources of caffeine which may be utilized as a complete or partial source of caffeine include green tea, guarana, puerh, mate, black tea, cola nuts, cocoa, and coffee. As used herein, green tea, guarana, coffee, and mate are the most preferred botanical sources of caffeine, most preferably green tea, guarana, and coffee. Any bracer utilized herein is preferably present in physiologically relevant amounts, which means that the sources used in the practice of this invention provide a safe and effective quantity.

3G. Buffering Agents

Buffering agents are well known in the art; non-limiting examples include carbonic acid, citric acid, acetic acid, phosphoric acid, succinic acid and various salts of such acids.

3H. Coloring Agents

One or more coloring agent(s) may also be optionally included in the formulation compositions of the invention. Coloring agents may include FD&C Dyes, FD&C Lakes, or natural coloring agents. Non-limiting examples of FD&C Dyes include FD&C yellow #5, FD&C blue #2, and FD&C red #40. Non limiting examples of FD&C Lakes include FD&C Lake red #40, FD&C Lake yellow #6, and FD&C Lake blue #1. Non-limiting examples of natural coloring agents include fruit, vegetable, and/or plant extracts from sources such as grape, black currant, aronia, carrot, beetroot, red cabbage, and hibiscus.

3I. pH Modifiers

Optionally, one or more pH modifier(s) may be included to raise or lower the pH of the formulation compositions of the invention. The pH of the formulation compositions may be lowered or raised for organoleptic effects, or improving physicochemical properties such as increasing solubility of the dissolved compounds. The pH modifiers can be referred to as acidulants or alkalizing agents. Non-limiting examples of acidulants are food grade edible acids such as lactic acid, citric acid, malic acid, fumaric acid, adipic acid, phosphoric acid, gluconic acid, tartaric acid, ascorbic acid, acetic acid, succinic acid, and maleic acid. The pH of the formulation compositions can be adjusted by varying the ratio of cations (e.g. calcium, magnesium, sodium and potassium cations) to acid components. Non-limiting examples of alkalizing agents are compounds such as sodium hydroxide, potassium hydroxide, calcium hydroxide and magnesium hydroxide.

3J. Preservatives

Non-limiting examples of preservatives that may be optionally included in the formulation compositions of the invention include acetic acid, citric acid, benzoic acid, sorbic acid, sulphur dioxide, potassium benzoate, potassium sorbate, sodium benzoate, sodium sorbate, calcium benzoate, calcium sorbate, sodium citrate, potassium citrate, sodium hexametaphosphate, nitrites, sulfites etc. Preservatives may also include antioxidants such as ascorbic acid, EDTA, BHA, BHT, TBHQ, dehydroacetic acid, dimethydicarbonate, ethoxyquin, and parabens.

B. Some Embodiments of the Formulation Compositions

1x. In one embodiment, the formulation composition is an aqueous composition comprising the following ingredients, such that the sum of concentrations of the dissolved calcium and magnesium compounds is between about 1 molar to the point of saturation:
 a. water;
 b. one or more dissolved calcium compound(s); and
 c. one or more dissolved magnesium compound(s).

The sum of the concentrations of the dissolved calcium and magnesium compounds is required to be at least about 1 molar or more since this provides relatively high quantities of calcium and/or magnesium in small volumes, while also providing microbial resistance, as shown later in more detail.

2x. The composition of embodiment 1x, wherein the sum of the concentrations of the dissolved calcium compound(s) and dissolved magnesium compound(s) is in the range of about 1.5 molar to the point of saturation.

3x. The composition of embodiment 1x, wherein the sum of the concentrations of the dissolved calcium compound(s) and dissolved magnesium compound(s) is in the range of about 2 molar to the point of saturation.

4x. The composition of embodiment 1x, wherein the sum of the concentrations of the dissolved calcium compound(s) and dissolved magnesium compound(s) is in the range of about 1 molar to about 4.2 molar.

5x. The composition of embodiment 1x, wherein the sum of the concentrations of the dissolved calcium compound(s) and dissolved magnesium compound(s) is in the range of about 1.5 molar to about 4.2 molar.

6x. The composition of embodiment 1x, wherein the sum of the concentrations of the dissolved calcium compound(s) and dissolved magnesium compound(s) is in the range of about 2.0 molar to about 4.2 molar.

7x. The composition of embodiment 1x, wherein calcium and magnesium are present in a molar ratio in the range of about 0.01 to 100 calcium to magnesium.

8x. The composition of embodiment 1x, wherein calcium and magnesium are present in a molar ratio in the range of about 0.1 to 10 calcium to magnesium.

9x. The composition of embodiment 1x, wherein calcium and magnesium are present in a molar ratio in the range of about 0.3 to about 3.2 calcium to magnesium.

10x. The composition of embodiment 1x, wherein the one or more dissolved calcium compound(s) are selected from calcium chloride, calcium acetate, calcium amino acid complexes, calcium amino ethyl phosphate, calcium arginate, calcium aspartate, calcium ascorbate, calcium citrate, calcium glubionate, calcium gluceptate, calcium gluconate, calcium bromide, calcium iodide, calcium lactate, calcium malate, calcium orotate, and calcium pyruvate; and the one more dissolved magnesium compound(s) are selected from magnesium chloride, magnesium acetate, magnesium amino acid complexes, magnesium arginate, magnesium aspartate, magnesium ascorbate, magnesium citrate, magnesium gluconate, magnesium glycinate, magnesium lactate, magnesium lysinate, magnesium malate, magnesium orotate, magnesium bromide, magnesium iodide, magnesium pyruvate and magnesium succinate.

11x. The composition of embodiment 1x, wherein the one or more dissolved calcium compound(s) are selected from calcium chloride and calcium acetate; and the one or more dissolved magnesium compound(s) are selected from magnesium chloride and magnesium acetate.

12x. The composition of embodiment 1x, comprising the dissolved compounds of calcium chloride and magnesium chloride.

13x. The composition of embodiment 1x, comprising the dissolved compounds of calcium chloride, magnesium chloride, and potassium chloride.

14x. The composition of embodiment 1x, further comprising one or more additional compatible mineral(s), vitamin(s), antioxidant(s), herbal extract(s), flavonoid(s), flavoring agent(s), sweetener(s), bracer(s), buffering agent(s), coloring agent(s), pH modifier(s), preservative(s).

15x. The composition of embodiment 14x, wherein the additional compatible mineral(s) is one or more compound(s) of boron, cobalt, copper, chromium, fluorine, iodine, iron, manganese, molybdenum, nickel, phosphorus, potassium, selenium, silicon, silver, sodium, strontium, vanadium, and zinc.

16x. The composition of embodiment 14x, wherein the additional compatible vitamin(s), antioxidant(s), herbal extract(s) or flavonoid(s) is one or more of biotin, carnitine, coenzyme Q10, choline, folic acid, inositol, lycopene, lutein, astaxanthin, zeaxanthin, vitamin A, vitamin B, vitamin $B_{12}$, vitamin $B_2$, vitamin $B_3$, vitamin $B_5$, vitamin $B_6$, vitamin C, vitamin D, vitamin E, and vitamin K, apigenin, catechins, epicatechin, gallocatechin, epigallocatechin, epicatechin gallate, epigallocatechin gallate, kaempferol, luteolin, myricetin, quercetin, rutin, tannins, and theaflavins.

17x. The composition of embodiment 14x, wherein the additional compatible flavor(s) or sweetener(s) is one or more of: fruit flavors of orange, lemon, lime, grapefruit, apple, grape, cherry, pineapple, fruit punch, strawberry, kiwi, tangerine, raspberry, mango, cocoa, papaya, apricot, passion fruit, and cupuacu; botanical flavors of kola, tea, aloe vera, guarana, ginseng, ginkgo, hawthorn, hibiscus, rose hips, chamomile, peppermint, fennel, ginger, licorice, lotus seed, schizandra, saw palmetto, sarsaparilla, safflower, St. Johns Wort, curcuma, cardamom, nutmeg, cassia bark, bunchu, cinnamon, jasmine, chrysanthemum, water chestnut, sugar cane, lychee, bamboo shoots, vanilla, and coffee; carbohydrate sweeteners of sucrose, unrefined cane sugars, honey, agave nectar, fructose, glucose, high fructose corn syrup; non-caloric sweeteners of stevia, erythritol, glycerin, licorice, glycyrrhizins, aspartame, saccharine, cyclamates, acesulfame K, L-aspartyl-L-phenylalanine lower alkyl ester sweeteners. L-aspartyl-D-alanine amides, L-aspartyl-D-serine amides, L-aspartyl-hydroxymethyl alkane amide sweeteners, L-aspartyl-1-hydroxyethylalkane amide sweeteners, and synthetic alkoxy aromatics.

18x. The composition of embodiment 14x, wherein the additional compatible bracer(s) is one or more of caffeine, theobromine, theophylline, extracts of cocoa, coffee, tea, green tea, black tea, guarana, kola nuts, cacao pods, mate, puerh, yaupon, and yoco.

19x. The composition of embodiment 14x, wherein the additional compatible buffering agent(s), coloring agent(s), pH modifier(s), or preservative(s) is one or more of: buffering agent of carbonic acid, citric acid, acetic acid, phosphoric acid, succinic acid and various salts of such acids; coloring agent of FD&C Dyes, FD&C Lakes, or natural coloring agents such as fruit, vegetable, and/or plant extracts of grape, black currant, aronia, carrot, beetroot, red cabbage, and hibiscus; pH modifier of lactic acid, citric acid, malic acid, fumaric acid, adipic acid, phosphoric acid, gluconic acid, tartaric acid, ascorbic acid, acetic acid, succinic acid, maleic acid, sodium hydroxide, potassium hydroxide, calcium hydroxide and magnesium hydroxide; preservative of acetic acid, citric acid, benzoic acid, sorbic acid, sulphur dioxide, potassium benzoate, potassium sorbate, sodium benzoate, sodium sorbate. TBIIQ, calcium benzoate, calcium sorbate, sodium citrate, potassium citrate, sodium hexametaphosphate, nitrites, sulfites, ascorbic acid, EDTA, BHA, BHT, TBHQ, dehydroacetic acid, dimethydicarbonate, ethoxyquin, and parabens.

20x. The composition of embodiment 1x, wherein one or more additional compatible ingredient(s) are dissolved, solubilized, emulsified or suspended within the composition.

21x. The composition of embodiment 1x, wherein one or more of the calcium or magnesium compound, chelate or complex is formed in situ, as may occur due to an acid-base reaction in water.

22x. The composition of embodiment 20x, wherein one or more of the compound, chelate or complex is formed in situ, as may occur due to an acid-base reaction in water.

E. Properties of the Compositions of the Invention

The elements of the formulation compositions need to be suitable for consumption within a dietary supplement, sufficiently water soluble to provide at least about 1 molar or higher summed concentration of calcium and magnesium compounds dissolved in water, and compatible with the other ingredients of the formulation. There are several considerations for developing useful liquid dietary supplement formulations. The major considerations include sufficient physico-chemical stability of the formulation, and also resistance of the formulation to microbial growth over time during storage and use. There are many liquid dietary supplements containing calcium and magnesium compounds that are commercially available or described in prior literature. However, to the inventor's knowledge there are no prior art examples of aqueous liquid formulations that have relatively high concentrations (e.g. at least 1 Molar) of dissolved calcium and magnesium compounds in combination, are reasonably stable, and also have inherent resistance to microbial growth in the absence of additional preservatives. The present invention discloses formulation compositions that have these aforementioned characteristics, and therefore are new and useful compositions not previously available in prior art. Although it is possible to add optional preservatives to the formulations described in this invention, a very useful feature of these formulations is an inherent resistance to microbial growth and thus the need for adding preservatives can be reduced, minimized or eliminated. This in turn makes the formulation compositions simpler, more versatile, and more suitable for regular use.

In order to achieve this inherent resistance to microbial growth, the formulation compositions of this invention contain calcium and magnesium compounds dissolved at suitable concentrations in water such that the sum of the concentrations of the dissolved calcium compound(s) and dissolved magnesium compound(s) is at least about 1 molar, more preferably at least about 1.5 molar, and most preferably at least about 2 molar or more, up to the point of saturation.

In another embodiment, the formulation composition comprises dissolved calcium compound(s) and dissolved magnesium compound(s) in a range of about 1 molar to saturation along with excess undissolved solids being present, as in a suspension, or undissolved non-aqueous liquid droplets being present, as in an emulsion. Although fully dissolved and clear liquid formulations are preferable, the compositions of the invention have useful characteristics such as beneficial amounts of dissolved calcium and magnesium, along with inherent microbial resistance, even if some ingredients are present that are poorly soluble. Thus the calcium & magnesium compositions of this invention can be considered as useful liquid vehicles for the delivery of additional nutritional compounds, whether those additional compounds are sufficiently water soluble or not.

F. Kits of the Invention

The compositions of the present invention may be utilized in kits as described herein. The kits of the present invention comprise one or more compositions of the present invention together with information which informs a user of the kit, by words, pictures, and/or the like, that use of the kit will provide supplementation of a beverage or food with calcium and magnesium, and with additional beneficial compounds where applicable.

In a particularly preferred embodiment, the information is printed on a container holding the composition, e.g., a bottle. These preferred kits may be in the form of one bottle containing the composition, or may be obtained as a plurality of bottles each containing the composition. For example, the kits may be obtained as one bottle, or cases of four, six, seven, or eight bottles co-packaged together. The preferred kits may also include one or more dispensing means, such as dispensing cap, dropper, syringe, dispensing pump, small measuring cup, or spoon, for providing a measured amount of the formulation into a cup or other suitable quantity of water, juice, other beverage, or food. The preferred kits may also include instructions for dispensing and mixing the composition into a beverage or food. In another preferred embodiment, a kit may provide a large quantity of a formulation composition of the present invention to be utilized during manufacture of a fortified beverage or food, for subsequent distribution. In another embodiment, a kit may comprise one or more of the formulation composition(s) of the present invention, containing instructions to use in combination with, or preferably co-packaged with, one or more commercially available dietary supplements) such as a vitamin product, a multivitamin product, a mineral product, a trace mineral product, a herbal product etc.

G. Methods of the Invention

The formulation compositions described in this invention comprise calcium and magnesium compounds dissolved in water, wherein the sum of the concentrations of these compounds is about 1 molar or more, and wherein additional optional ingredients may be present. Several embodiments of the compositions have already been described. Some practical uses are described below.

The compositions may be used to mineralize drinking water with calcium and magnesium compounds, along with other optional minerals, vitamins or other ingredients that are beneficial for health. This is especially useful when the water to be mineralized is deficient in minerals, such as in the case of distilled or reverse-osmosis filtered waters, rain water, etc. Mineralizing of water is achieved by adding small quantities of the formulation compositions to drinking water.

There are many methods by which a formulation of this invention can be added to water or other beverages. For example, the formulation may be dispensed directly from a bottle thru a dispensing cap, or it may be added to the water using a dropper, syringe, spoon, small measuring cup, dispensing pump etc. The quantity to be added depends on the amount of water that needs to be mineralized, and the level of mineralization required. Since the formulations of this invention are aqueous liquids, mixing with water is easily achieved. If needed, some mechanical mixing may be employed to provide a homogenous solution of the mineralized water.

The formulations described in this invention can also be used as a dietary supplement to increase intake of calcium, magnesium and other optional beneficial ingredients that may be present in the formulation. Using the supplement in this manner is especially useful when the individual taking the supplement has a calcium and/or magnesium mineral deficiency, or has a diet or condition that can lead to such deficiencies. Since the formulations have high concentrations of calcium and magnesium compounds, they are intended to be ingested only after dilution into water, juice or some other beverage, soup, food or meal. This is achieved simply by adding a measured amount of the formulation into a cup or other suitable quantity of water, juice or other beverage, soup, food or meal. The measured amount of the formulation composition added to the cup of beverage or serving of food may be at least about 1 µl, preferably at least about 5 µl, more preferably at least about 25 µl, and most preferably at least about 50 µl, which is the approximate volume of one water drop. The measured amount of the formulation composition added to the cup of beverage or serving of food may be up to about 60 ml (4 tablespoons), preferably up to about 30 ml (2 tablespoons), more preferably up to about 15 ml (1 tablespoon), still more preferably up to 10 ml (2 teaspoons), and most preferably up to about 5 mls (1 teaspoon).

The formulations of this invention can also be prepared and used at a large scale. For example, measured amounts of formulation can be added to a large vessel or tank to mineralize water, or to manufacture a dietary supplement or fortified food. During such manufacturing processes, the formulations can be added by either weight or volume, on a continuous or intermittent basis, manually or by using a metering device.

The calcium and magnesium formulations described in this invention can also be used as a base or vehicle for dietary supplement formulations with additional optional ingredients. The added ingredients would provide additional desirable characteristics to the basic formulations, such as including additional beneficial minerals, vitamins, antioxidants, herbal extracts, flavonoids, bracers, and/or other beneficial ingredients, including pleasant flavors, visually attractive colors, etc. As a simple illustration of this, some of the formulations described in Examples 2 and 3 provide the beneficial mineral potassium, along with calcium and magnesium.

The methods of the invention also include methods of designing a formulation composition. In one embodiment, the invention provides a method of designing an aqueous composition comprising one or more dissolved calcium compound(s) and one or more dissolved magnesium compound(s), comprising:
   a. Selecting one or more calcium compound(s) and one or more magnesium compound(s) for the composition; and
   b. Determining the amounts of the individual calcium and magnesium compounds to be included in the composition so that the sum total dissolved concentration of the calcium and magnesium compound(s) is at least about 1 molar, preferably at least about 1.5 molar, and more preferably at least about 2 molar.
   c. Optionally, selecting or determining amounts of one or more optional ingredient(s) so that these are compatible with the dissolved calcium and magnesium formulations.

The methods of the invention include methods of preparation or manufacture. Various processes may be used to prepare the compositions that have been described. Preferably the compositions are prepared by one or more simple processes comprising dissolution or mixing of the ingredients into water. However other processes may also be employed. Non-limiting examples of commonly used processes may include mixing of ingredient(s) into au aqueous solution; mixing of one or more aqueous solution(s); removal of water from dilute composition(s) by evaporation, dialysis, ultrafiltration or freeze-drying to reach the desired concentrations of the calcium and magnesium compounds and optional ingredients; and by utilizing combinations of these processes. Further, in the case of poorly soluble optional ingredient(s), solubilization, suspension and/or emulsification processes may be employed.

In the methods of designing or manufacturing compositions of the invention, non-limiting examples of the compounds that may be selected include one or more of the calcium compounds, the magnesium compounds, or the optional compounds listed earlier in Section C of the detailed description.

H. Additional Embodiments of the Invention

Based on the prior sections, additional non-limiting embodiments of the present inventions are described below:

31x. A method of fortifying a beverage or food with calcium and magnesium comprising:
   adding at least about 1 µl up to about 60 ml of the composition of embodiment 1x to about one cup of the beverage or about one serving of the food, or adding correspondingly larger or smaller amounts of the composition to larger or smaller quantities of the beverage or food.

32x. A method of fortifying a beverage or food with calcium and magnesium comprising:
   adding at least 1 drop or about 50 µl, up to about 30 ml of the composition of embodiment 1x to one cup of the beverage or one serving of the food, or adding correspondingly larger or smaller amounts of the composition to larger or smaller quantities of the beverage or food.

33x. A method of fortifying a beverage or food with calcium, magnesium and additional optional ingredient(s), comprising:
   adding at least 1 drop or about 50 µl, up to about 30 ml of the composition of embodiment 20x to one cup of the beverage or one serving of the food, or adding correspondingly larger or smaller amounts of the composition to larger or smaller quantities of the beverage or food.

34x. A method of designing an aqueous composition comprising one or more dissolved calcium compound(s) and one or more dissolved magnesium compound(s), comprising:
   a. selecting one or more calcium compound(s) and one or more magnesium compounds) to be included in the composition; and
   b. selecting or determining the amounts of the individual calcium and magnesium compounds to be included in the composition so that the dissolved compounds remain soluble and compatible upon storage at room temperature, while the sum total concentration of the calcium compound(s) and the magnesium compound(s) is at least about 1 molar.

35x. The method of embodiment 34x, wherein one or more additional ingredient(s) are included within the composition by a) selecting one or more additional ingredient(s) to be included within the composition and b) selecting or determining the amount(s) of the additional ingredients such that the dissolved compound(s) remain soluble and compatible upon storage at room temperature.

36x. The method of embodiment 34x, wherein one or more additional ingredient(s) are included within the composition by a) selecting one or more additional ingredient(s) to be included within the composition and b) selecting or determining the amount(s) of the additional ingredient(s) such that the additional ingredient(s) are dissolved, solubilized, emulsified or suspended within the composition.

37x. The method of embodiment 34x, wherein the one or more calcium compound(s) are selected from calcium chloride, calcium acetate, calcium amino acid complexes, calcium aminoethyl phosphate, calcium arginate, calcium aspartate, calcium ascorbate, calcium citrate, calcium glubionate, calcium gluceptate, calcium gluconate, calcium bromide, calcium iodide, calcium lactate, calcium malate, calcium orotate, and calcium pyruvate; and the one more dissolved magnesium compound(s) are selected from magnesium chloride, magnesium acetate, magnesium amino acid complexes, magnesium arginate, magnesium aspartate, magnesium ascorbate, magnesium citrate, magnesium gluconate, magnesium glycinate, magnesium lactate, magnesium lysinate, magnesium malate, magnesium orotate, magnesium bromide, magnesium iodide, magnesium pyruvate and magnesium succinate 38x. A method of manufacture of the composition of embodiment 1x, wherein the composition is prepared by a process comprising one or more of: mixing of ingredient(s) into water or aqueous solution; mixing of one or more aqueous solutions; or removal of water from dilute composition(s) by evaporation, dialysis, ultrafiltration, or freeze-drying.

39x. A method of manufacture of the composition of embodiment 20x, wherein the composition is prepared by a process comprising one or more of: mixing of ingredient(s) into water or aqueous solution; mixing of one or more aqueous solution(s); removal of water from dilute composition(s) by evaporation, dialysis, ultrafiltration, or freeze-drying; incorporation of poorly soluble ingredient(s) by solubilization; incorporation of poorly soluble Liquid ingredient(s) by emulsification; or incorporation of poorly soluble solid ingredient(s) by suspension.

40x. A kit comprising the composition of embodiment 1x

41x. A kit comprising the composition of embodiment 20x.

42x. A kit comprising the embodiment of 1x or 20x, copackaged with one or more commercially available vitamin product, multivitamin product, mineral product or herbal product.

EXAMPLES

The examples provided below explain the compositions of the invention further, and also demonstrate several of the embodiments. The examples are illustrative only, and variations may be made in the specific compositions as described within the scope of this application.

Example 1

Twenty five formulations were made with different concentrations of calcium chloride and magnesium chloride dissolved in distilled water. The formulations contained various ratios of elemental calcium to elemental magnesium in the formulations, as shown in Table 1. For each of these ratios, formulations were prepared at a total concentration (sum of calcium and magnesium compound concentrations) of 1M, 1.5M, 2.0M, 2.5M, and 3.0M. All the formulations were visually clear, demonstrating full dissolution of the calcium and magnesium compounds. A bacterial suspension of *E. coli* was spiked into aliquots of each of these 25 formulations and mixed. A positive control was also prepared, by spiking and mixing the same *E. coli* suspension in distilled water. The spiked samples were incubated for 1 day at room temperature, and dilutions were then plated on Petrifilm plates (designed for total aerobic counts) to evaluate microbial growth or inhibition. The results are summarized in Table 1. Relative to the positive control, microbial growth was somewhat reduced (approx 2-fold) in the formulations having a total calcium & magnesium compound concentration of 1M. In contrast, microbial growth was significantly reduced (approx. 10-fold reduction) in the formulations having total summed concentration of 1.5 M. The microbial count reduction observed was approx 100-fold or greater, and practically no bacterial counts were observed for the spiked formulations where the sum of the calcium and magnesium compounds was 2M, 2.5M or 3M, irrespective of the ratio of calcium to magnesium.

TABLE 1

| Formulation Code | Calcium chloride concentration (M) | Magnesium chloride concentration (M) | Calcium to Magnesium ratio | Total salt conc. (M) | Visual appearance | Microbial inhibition | % RDA* in 5 ml (Ca, Mg) |
|---|---|---|---|---|---|---|---|
| CM2A1.0 | 0.76 | 0.24 | 3.2 | 1.0 | Clear | Slight | 15, 7 |
| CM2B1.0 | 0.6 | 0.4 | 1.5 | 1.0 | Clear | Slight | 12, 12 |
| CM2C1.0 | 0.5 | 0.5 | 1.0 | 1.0 | Clear | Slight | 10, 15 |
| CM2D1.0 | 0.4 | 0.6 | 0.7 | 1.0 | Clear | Slight | 8, 18 |
| CM2E1.0 | 0.24 | 0.76 | 0.3 | 1.0 | Clear | Slight | 5, 23 |
| CM2A1.5 | 1.14 | 0.36 | 3.2 | 1.5 | Clear | Significant | 23, 11 |
| CM2B1.5 | 0.89 | 0.61 | 1.5 | 1.5 | Clear | Significant | 18, 18 |
| CM2C1.5 | 0.75 | 0.75 | 1.0 | 1.5 | Clear | Significant | 15, 23 |
| CM2D1.5 | 0.61 | 0.89 | 0.7 | 1.5 | Clear | Significant | 12, 27 |
| CM2E1.5 | 0.36 | 1.14 | 0.3 | 1.5 | Clear | Significant | 7, 35 |
| CM2A2.0 | 1.52 | 0.48 | 3.2 | 2.0 | Clear | High | 31, 14 |
| CM2B2.0 | 1.19 | 0.81 | 1.5 | 2.0 | Clear | High | 24, 25 |
| CM2C2.0 | 1.0 | 1.0 | 1.0 | 2.0 | Clear | High | 20, 30 |
| CM2D2.0 | 0.81 | 1.19 | 0.7 | 2.0 | Clear | High | 16, 36 |
| CM2E2.0 | 0.48 | 1.52 | 0.3 | 2.0 | Clear | High | 10, 46 |
| CM2A2.5 | 1.9 | 0.6 | 3.2 | 2.5 | Clear | High | 38, 18 |
| CM2B2.5 | 1.49 | 1.01 | 1.5 | 2.5 | Clear | High | 30, 31 |
| CM2C2.5 | 1.25 | 1.25 | 1.0 | 2.5 | Clear | High | 25, 38 |
| CM2D2.5 | 1.01 | 1.49 | 0.7 | 2.5 | Clear | High | 20, 45 |
| CM2E2.5 | 0.6 | 1.9 | 0.3 | 2.5 | Clear | High | 12, 58 |
| CM2A3.0 | 2.29 | 0.71 | 3.2 | 3.0 | Clear | High | 46, 22 |
| CM2B3.0 | 1.79 | 1.21 | 1.5 | 3.0 | Clear | High | 35, 37 |
| CM2C3.0 | 1.5 | 1.5 | 1.0 | 3.0 | Clear | High | 30, 46 |
| CM2D3.0 | 1.21 | 1.79 | 0.7 | 3.0 | Clear | High | 24, 54 |
| CM2E3.0 | 0.71 | 2.29 | 0.3 | 3.0 | Clear | High | 14, 69 |

*RDA: recommended daily allowance, based on a standard 2000 calorie diet

Example 2

Sixteen formulation compositions were prepared in four sets as described below, and shown in Table 2. The first set of formulations was prepared with calcium chloride and magnesium acetate dissolved in distilled water. The second set was prepared with calcium acetate and magnesium chloride dissolved in distilled water. The third set was prepared with calcium chloride, magnesium chloride, calcium acetate and magnesium acetate dissolved in distilled water. The fourth set was prepared with calcium chloride, magnesium chloride, and potassium chloride dissolved in distilled water. Within each set, four formulations were prepared at a total summed calcium and magnesium compound concentration of 1M, 1.5M, 2.0M, and 2.5M. All formulations were visually clear, demonstrating full dissolution of the compounds. A bacterial suspension of *E. coli* was spiked into aliquots of each of these 16 formulations and mixed. A positive control was also prepared, by spiking and mixing the same E. coli suspension in distilled water. The spiked samples were incubated for 1 day at room temperature, and dilutions were then plated on Petrifilm plates (designed for total aerobic counts) to evaluate microbial growth or inhibition. The results are summarized in Table 2. Relative to the positive control, microbial growth was somewhat reduced (approx 2-fold) in the formulations having a total summed concentration of 1M. In contrast, microbial growth was significantly reduced (approx 10-fold) in the formulations having total summed concentration of 1.5 M. Further, the microbial count reduction was approx 100-fold or greater, and there were practically no bacterial counts observed for the spiked formulations where the sum of the calcium and magnesium compounds was 2M or 2.5M, irrespective of the ratio of calcium to magnesium, or the specific type of compound used. These results were consistent with the results seen earlier in Example 1, and show that the formulations behaved consistently when other compounds of calcium and magnesium were used in various combinations, and also when an additional optional compound was added. Further, the 16 formulations were passed thru a 0.2 micron pore-size filter to remove any extraneous particulates, and stored at room temperature in plastic tubes with caps. They were inspected after 3 months and then again after 13 months, and all the formulations remained clear and soluble, with no evidence of microbial growth.

one of the formulations demonstrates inclusion of an additional optional ingredient. The formulations were passed thru a 0.2 micron pore-size filter to remove any extraneous particulates, and stored at room temperature in plastic bottles with dispensing caps. These formulations were tested a) for mineralizing reverse-osmosis (RO) filtered drinking water, and b) for dietary supplementation. Mineralization of water was accomplished by adding one or more drop(s) of formulation to an empty cup of water, and then filling the cup with RO filtered, or distilled water. Mineralized water consistently tasted better (normal) as compared to RO filtered or distilled waters, due to the presence of added minerals. The presence of added minerals was confirmed by conductivity measurements to estimate total dissolved solids (TDS). Typically, the TDS value of RO filtered water was 5 ppm and the TDS value of distilled water was less than 1 ppm. The addition of a single drop (approx 50 µL) of any one of the two formulations of this example to a standard size 8 oz. cup of RO or distilled water resulted in a TDS of about 100 ppm. Additional dietary supplementation of calcium and magnesium was accomplished in a manner similar to the mineralization of water, by adding larger quantities (up to one teaspoon) of formulation to a cup of water or juice, and then drinking the entire contents. The formulations taken in this manner had a distinct taste when diluted in water. However, the taste was masked when diluted in juice.

TABLE 2

| Formula Code | $CaCl_2$ conc. (M) | $MgCl_2$ conc. (M) | Calcium acetate conc. (M) | Magnesium acetate conc. (M) | KCl conc. (M) | Ca & Mg salts sum conc. (M) | Visual Appearance | Microbial inhibition | % RDA in 5 ml (Ca, Mg) |
|---|---|---|---|---|---|---|---|---|---|
| CM3A1.0 | 0.67 | — | — | 0.33 | — | 1.0 | Clear | Slight | 13, 10 |
| CM3A1.5 | 1.0 | — | — | 0.5 | — | 1.5 | Clear | Significant | 20, 15 |
| CM3A2.0 | 1.34 | — | — | 0.66 | — | 2.0 | Clear | High | 27, 20 |
| CM3A2.5 | 1.67 | — | — | 0.83 | — | 2.5 | Clear | High | 33, 25 |
| CM4A1.0 | — | 0.67 | 0.33 | — | — | 1.0 | Clear | Slight | 7, 20 |
| CM4A1.5 | — | 1.0 | 0.5 | — | — | 1.5 | Clear | Significant | 10, 30 |
| CM4A2.0 | — | 1.34 | 0.66 | — | — | 2.0 | Clear | High | 13, 41 |
| CM4A2.5 | — | 1.67 | 0.83 | — | — | 2.5 | Clear | High | 17, 51 |
| CM5A1.0 | 0.4 | 0.4 | 0.1 | 0.1 | — | 1.0 | Clear | Slight | 10, 15 |
| CM5A1.5 | 0.6 | 0.6 | 0.15 | 0.15 | — | 1.5 | Clear | Significant | 15, 23 |
| CM5A2.0 | 0.8 | 0.8 | 0.2 | 0.2 | — | 2.0 | Clear | High | 20, 30 |
| CM5A2.5 | 1.0 | 1.0 | 0.25 | 0.25 | — | 2.5 | Clear | High | 25, 38 |
| CM6A1.0 | 0.5 | 0.5 | — | — | 0.25 | 1.0 | Clear | Slight | 10, 15 |
| CM6A1.5 | 0.75 | 0.75 | — | — | 0.3 | 1.5 | Clear | Significant | 15, 23 |
| CM6A2.0 | 1.0 | 1.0 | — | — | 0.4 | 2.0 | Clear | High | 20, 30 |
| CM6A2.5 | 1.25 | 1.25 | — | — | 0.5 | 2.5 | Clear | High | 25, 38 |

Example 3

Two formulations were prepared in distilled water, with even greater concentrations of calcium and magnesium compounds as compared to prior examples (total summed concentration of about 4.2 M) as compared to the earlier examples. It should be noted that the formulations presented in this example are close to the point of saturation. One of these formulations was prepared with calcium chloride and magnesium chloride; and the other formulation included a third compound (potassium chloride) along with the calcium and magnesium compounds, as shown in Table 3. It should be noted that inclusion of the potassium compound within The formulations were inspected after 3 months and remained as clear liquids, with no evidence of microbial growth. The formulations were inspected again after 13 months, and remained clear liquids with no evidence of microbial growth. Since these formulations contain simple compounds of calcium and magnesium, there is no concern of any chemical degradation. Since these formulations also inhibit any microbial growth, they are expected to have a long shelf life of several years when stored in closed containers, and refrigeration is not needed. Thus these formulations are physically and chemically stable, do not allow bacterial growth, and are convenient to store and use.

TABLE 3

| Formula Code | CaCl$_2$ conc. (M) | MgCl$_2$ conc. (M) | KCl conc. (M) | Visual appearance after 13 months storage | Microbial growth after 13 months storage | Typical TDS* (ppm) of mineralized water, after adding 2 drops (approx 100 μL) of formulation to 8 oz RO** water | % RDA of Calcium, Magnesium, Potassium in 1 teaspoon (5 ml) |
|---|---|---|---|---|---|---|---|
| CM1 | 2.5 | 1.65 | — | Clear | No | 205 | 50, 50, NA |
| CMK1 | 2.5 | 1.65 | 0.45 | Clear | No | 220 | 50, 50, 2.5 |

*TDS: Total dissolved solids, based on conductivity (with sodium chloride reference)
**RO water: reverse-osmosis filtered (purified and demineralized) water.
TDS of RO water was typically 5 ppm.

Example 4

Two drops of formulation CM1 mentioned in Table 3 are added to one 8 oz cup of water. Drinking 8 such cups of mineralized water a day will provide about 8% of the recommended intake of calcium and magnesium, based on a standard 2000 calorie diet. If two drops of formulation CMK1 mentioned in Table 3 are used instead of CM1, drinking 8 such cups of mineralized water a day will provide about 8% of the recommended intake of calcium and magnesium, along with a trace quantity of potassium, which also helps to slightly improve the water taste.

Example 5

In the case of formulation CMK1 mentioned in Table 3, 1 teaspoon is added into a cup of water. Consuming the entire contents of the cup will provide 50% of the recommended daily intake amount of calcium and magnesium, along with about 2.5% of the recommended intake of potassium, based on a standard 2000 calorie diet. Alternatively, the formulation is added to a cup of juice or beverage, or added to a serving of soup or some other suitable food, if taste masking of the formulation ingredients is desired. As described in an earlier section, it is also possible to add sweeteners or flavors for improved taste. Further, as described in an earlier section, a variety of optional ingredients may be added to the basic calcium and magnesium compositions described in this and the earlier examples. Therefore, the calcium and magnesium compositions of the invention, described in earlier embodiments and within the examples shown in the above tables, serve as a useful base vehicle for additional ingredients, allow convenient storage while inhibiting microbial growth, and allow consumption in a convenient manner while providing useful minerals along with additional dietary ingredients.

The examples provided in the above section demonstrate several of the embodiments, and also provide several variations of the formulation compositions of the invention. Further, formulations within the scope of the invention can be varied easily by changing concentrations of calcium or magnesium compounds, and by adding additional optional ingredients. Variations or alternative embodiments of the present invention will be obvious to those skilled in the art and it is intended that these variations are within the scope of the present invention.

What has been described and illustrated herein are preferred embodiments of the invention along with some variations. The terms and descriptions used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

The invention claimed is:

1. An aqueous composition comprising:
   a. water;
   b. one or more dissolved calcium compound(s); and
   c. one or more dissolved magnesium compound(s):
   wherein the one or more dissolved calcium compound(s) are selected from calcium chloride and calcium acetate and the one or more dissolved magnesium compound(s) are selected from magnesium chloride and magnesium acetate,
   wherein the sum of the concentrations of the dissolved calcium compound(s) and dissolved magnesium compound(s) is from 1 Molar to the point of saturation,
   wherein the molar ratio of calcium to magnesium is from 0.3 to 3.2, and
   wherein the calcium and magnesium compounds remain stable in solution at room temperature for at least 3 months.

2. The composition of claim 1, wherein the sum of the concentrations of the dissolved calcium compound(s) and dissolved magnesium compound(s) is from 1 Molar to 4.2 Molar.

3. The composition of claim 1, wherein the sum of the concentrations of the dissolved calcium compound(s) and dissolved magnesium compound(s) is from 1.5 Molar to 4.2 Molar.

4. The composition of claim 1, wherein the sum of the concentrations of the dissolved calcium compound(s) and dissolved magnesium compound(s) is from 2 Molar to 4.2 Molar.

5. The composition of claim 1, wherein the calcium compound comprises calcium chloride and the magnesium compound comprises magnesium chloride.

6. The composition of claim 5, further comprising potassium chloride.

7. The composition of claim 1, wherein one or more additional compatible ingredient(s) is dissolved, solubilized, emulsified, or suspended within the composition.

8. The composition of claim 1, wherein one or more of the dissolved compounds is formed in situ within the composition.

9. A method of fortifying a beverage, comprising:
   adding at least 1 μl up to 60 ml of the composition of claim 1 to 240 ml (one cup) of the beverage; or adding correspondingly smaller or larger amounts of the composition to smaller or larger quantities of the beverage.

10. The method according to claim 9, comprising:

adding at least 50 µl (one drop), up to 30 ml of the composition of claim 1 to 240 ml (one cup) of the beverage; or adding correspondingly smaller or larger amounts of the composition to smaller or larger quantities of the beverage.

11. The method according to claim 10, wherein one or more additional compatible ingredient(s) is dissolved, solubilized, emulsified, or suspended within the composition.

12. A kit comprising the composition of claim 1.

13. The kit according to claim 12, wherein one or more additional compatible ingredient(s) is dissolved, solubilized, emulsified, or suspended within the composition.

14. A method for manufacturing the composition of claim 1, wherein the composition is prepared by a process comprising one or more of:

mixing of ingredient(s) into water or aqueous solution;

mixing of one or more aqueous solution(s); or removing water from dilute composition(s) by evaporation, dialysis, ultrafiltration, or freeze-drying.

* * * * *